Patented Feb. 26, 1929.

1,703,377

UNITED STATES PATENT OFFICE.

CARLISLE N. ANDERSON, OF DETROIT, MICHIGAN, ASSIGNOR TO PARKE, DAVIS & COMPANY, OF DETROIT, MICHIGAN, A CORPORATION OF MICHIGAN.

MEDICINAL COMPOUND.

No Drawing.   Application filed February 6, 1928.   Serial No. 252,413.

The invention relates to a new stable anthelmintic product adapted for administration to animals afflicted with intestinal worms.

The object of the invention is to produce a product in such form as to be convenient for administration to the animals in a single dose, and which will remain stable without chemical decomposition.

It has been discovered that tetrachlorethylene when chemically pure is an ideal anthelmintic product and one which can be used safely on a large number of different animals, such as horses, cattle, swine, goats, dogs, sheep, foxes, cats and poultry. My invention consists in associating with tetrachlorethylene means for maintaining the same in a stable condition when the product is in a form adapted for commercial distribution and use.

According to my invention the tetrachlorethylene is marketed in such a manner as to prevent the penetration of the actinic rays of light thereinto, and this is preferably done by adding to the liquid substance a suitable coloring material. A red color is particularly desirable due to the fact that it absorbs the light rays of shorter length associated with the ultra end of the spectrum, which rays are the ones most active in producing decomposition. Any other color adapted to absorb the actinic rays might be used but since the red also presents a pleasing appearance it is the one preferably selected.

The coloration of the liquid may be obtained in any suitable way, such for example as by incorporating with the tetrachlorethylene an aniline dye or some other suitable oil soluble dye. As a specific example, an aniline dye known by the trade name of Oil Soluble Red O is well suited for the purpose but any other dye or coloring material adapted to prevent penetration of the actinic rays may be used as an equivalent.

The dyed tetrachlorethylene is preferably marketed in capsule form since in this condition it is easily handled and administered to the animals. The capsule form also permits marketing the liquid in different sizes so that each capsule contains just the required amount for an individual dose for a particular class of animals. The capsules are usually of soluble gelatin, although other suitable material may be used if desired. The capsules are ordinarily transparent, thus permitting the colored tetrachlorethylene to be visible through the capsule walls and giving a distinctive appearance to the product. The fact that the capsules are transparent illustrates the necessity of incorporating the coloring mater in the product, for otherwise the liquid would often be exposed to the actinic rays of the sunlight for considerable periods of time prior to its use. It has been discovered that tetrachlorethylene when unprotected from these actinic rays is subject to chemical decomposition forming undesirable impurities, which may in some instances be actually injurious to the animals. When these rays are kept from the liquid it can be stored indefinitely without any decomposition whatsoever. Therefore by associating the coloring material with the tetrachlorethylene I have produced an anthelmintic product, which is not only a very effective remedy for afflicted animals but is entirely safe for use due to its freedom from all products of decomposition.

As an alternative method of marketing the new product, the coloring matter may be incorporated into the walls of the capsule itself, in which case the tetrachlorethylene within the capsule may be uncolored and in its natural state. Thus a soluble gelatin capsule may have a red color incorporated therein so that the transparent walls will absorb the actinic rays and prevent their penetration into the liquid.

In either embodiment of my invention I have provided a means for marketing a stable therapeutic product having anthelmintic properties in a form that is convenient for administration to the animals in proper dosage, is convenient for manufacture distribution and storage prior to its actual use and is dependable as to quality since it remains stable at all times and uncontaminated with products of decomposition.

What I claim as my invention is:

1. An anthelmintic product comprising tetrachlorethylene and means for protecting the tetrachlorethylene from actinic rays.

2. An anthelmintic product adapted for administration to animals comprising a capsule containing liquid tetrachlorethylene and means for preventing penetration of the actinic rays into said liquid.

3. An anthelmintic product adapted for administration to animals comprising liquid tetrachlorethylene and a coloring material incorporated therein for preventing penetration of actinic rays of light.

4. An anthelmintic product adapted for administration to animals comprising liquid tetrachlorethylene and an oil soluble red dye dissolved in said liquid.

5. An anthelmintic product adapted for administration to animals comprising a soluble gelatin capsule having liquid tetrachlorethylene within the same and coloring material for preventing penetration of actinic rays of light into said liquid.

6. An anthelmintic product adapted for administration to animals comprising a soluble gelatin capsule having transparent walls, liquid tetrachlorethylene within said capsule and a red dye dissolved in said liquid tetrachlorethylene.

In testimony whereof I affix my signature.

CARLISLE N. ANDERSON.